(12) United States Patent
Chang

(10) Patent No.: US 9,965,270 B2
(45) Date of Patent: May 8, 2018

(54) UPDATING COMPUTER FIRMWARE

(71) Applicant: Quanta Computer Inc., Taoyuan (TW)

(72) Inventor: Keng-Wei Chang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days. days.

(21) Appl. No.: 14/789,245

(22) Filed: Jul. 1, 2015

(65) Prior Publication Data
US 2017/0003956 A1    Jan. 5, 2017

(51) Int. Cl.
G06F 9/44 (2018.01)
G06F 9/445 (2018.01)

(52) U.S. Cl.
CPC .............. *G06F 8/654* (2018.02); *G06F 8/658* (2018.02); *G06F 8/665* (2013.01); *G06F 8/68* (2013.01)

(58) Field of Classification Search
CPC . G06F 8/65; G06F 8/68; G06F 21/572; G06F 21/575
USPC ................................................ 717/167–178
See application file for complete search history.

(56) References Cited

U.S. PATENT DOCUMENTS

| | | | | |
|---|---|---|---|---|
| 9,395,968 B1* | 7/2016 | Nallagatla | ................. | G06F 8/61 |
| 2001/0050990 A1* | 12/2001 | Sudia | ..................... | G06Q 20/02 380/286 |
| 2002/0073304 A1* | 6/2002 | Marsh | ...................... | G06F 8/65 713/1 |
| 2002/0194313 A1* | 12/2002 | Brannock | ................. | G06F 8/65 709/220 |
| 2004/0259633 A1* | 12/2004 | Gentles | ................... | G07F 17/32 463/29 |
| 2005/0114639 A1* | 5/2005 | Zimmer | ............... | G06F 9/4401 712/244 |
| 2005/0144612 A1* | 6/2005 | Wang | ........................ | G06F 8/65 717/168 |
| 2006/0174240 A1* | 8/2006 | Flynn | .................... | G06F 9/4406 717/170 |
| 2008/0109647 A1* | 5/2008 | Gavens | .................... | G06F 8/65 713/2 |
| 2010/0332813 A1* | 12/2010 | Rothman | .............. | G06F 9/4401 713/2 |
| 2011/0131447 A1* | 6/2011 | Prakash | ................ | G06F 21/572 714/19 |
| 2012/0124357 A1* | 5/2012 | Zimmer | ................ | G06F 1/3203 713/2 |
| 2013/0290778 A1* | 10/2013 | Soderlund | ........... | G06F 11/1417 714/15 |

* cited by examiner

*Primary Examiner* — Duy Khuong T Nguyen
(74) *Attorney, Agent, or Firm* — Nixon Peabody LLP; Eduardo J. Quinones; Zhou Lu

(57) ABSTRACT

Systems, methods, and computer-readable storage media for updating a computer firmware. The system generates a user firmware volume within a computer firmware volume containing computer firmware used by the system during a boot process. In some cases, the user firmware volume can be a file system. The system also obtains a firmware file for updating the computer firmware used by the system during the boot process. Next, the system compares the firmware file with a content of the computer firmware volume to yield a comparison and, based on the comparison, stores the firmware file on the user firmware volume within the computer firmware volume without flashing an entire portion of the computer firmware used by the system during the boot process.

15 Claims, 9 Drawing Sheets

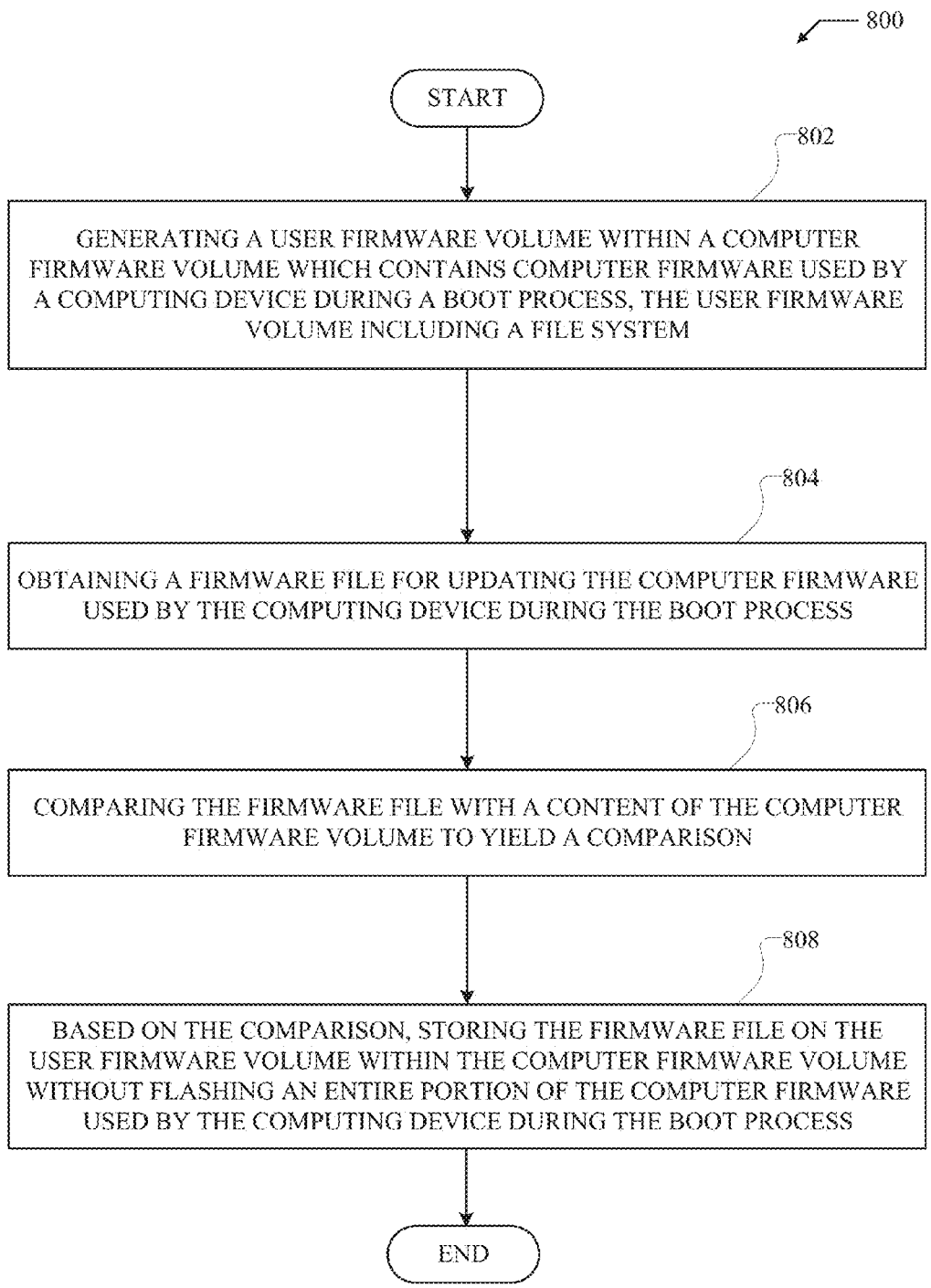

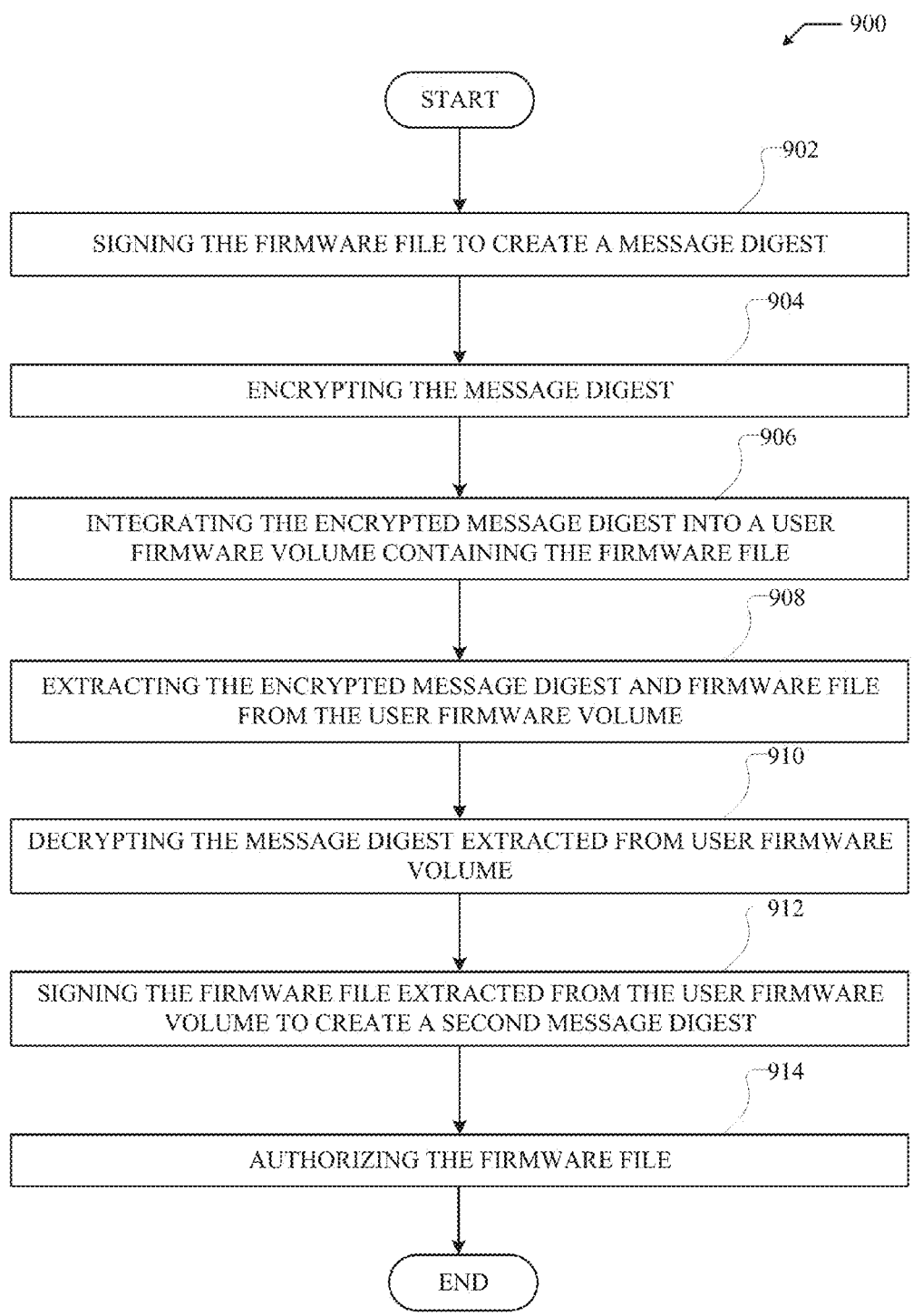

UPDATING COMPUTER FIRMWARE

TECHNICAL FIELD

The present technology pertains to computer firmware, and more specifically pertains to updating a computer's firmware without flashing the entire firmware image.

BACKGROUND

Typical computer systems use specific computer firmware during the booting process to recognize, initialize, and test the hardware present in the given computer system, and load a boot loader or operating system (OS). Firmware platforms, such as basic input/output system (BIOS) or unified extensible firmware interface (UEFI), provide an interface that allows a variety of different parameters to be set, such as hardware and booting configuration parameters. For example, a firmware interface may be used to specify clock and bus speeds, indicate what peripherals are attached to the computer system, configure specific monitoring procedures, and set a variety of other parameters that affect performance and power usage of the computer system.

The firmware of a computer system is typically stored in flash memory, such as non-volatile random access memory (NVRAM), read-only memory (ROM), or electrically erasable programmable read-only memory (EEPROM). The flash memory allows the firmware and firmware configurations to be rewritten without removing the memory chip from the computer device. Unfortunately, however, any modifications or updates to the firmware currently require the entire firmware image to be rewritten to the flash memory. This is called "flashing" the firmware image.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for updating computer firmware without flashing the entire firmware image. The system can generate a user firmware volume within a computer firmware volume containing computer firmware used by the system during a boot process. In some cases, the user firmware volume can be a file system. Moreover, the computer firmware volume can be a logical volume on one or more memory devices, such as a flash memory storage component of the system.

The system can obtain a firmware file for updating the computer firmware used by the system during the boot process. The system can obtain the firmware file from a separate device via a network, or generate and store the firmware file locally. For example, in some cases, the system can obtain the firmware file from a server or centralized location in order to deploy or integrate the firmware file into the computer firmware of the system. In other cases, the system can generate or compile the firmware file and store it in memory, such as ROM, for deployment or integration into the computer firmware of the system.

Next, the system can compare the firmware file with a content of the computer firmware volume and, based on the comparison, store the firmware file on the user firmware volume within the computer firmware volume without flashing an entire portion of the computer firmware used by the system during the boot process. The firmware file can include one or more firmware modules. The system can check if the firmware file is already in the computer firmware. For example, the system can check the computer firmware volume to determine if the firmware file is already in the computer firmware volume. If the system determines that the firmware file is not already in the computer firmware, it can simply add the firmware file to the computer firmware as a new component (i.e., new file or module). In some cases, the system can check if the firmware file is already in the computer firmware and/or add the firmware file to the computer firmware during a boot process of the system.

On the other hand, if the system determines that the firmware file corresponds to a firmware file that is already in the computer firmware, it can check or compare versions of the firmware file with the corresponding firmware file in the computer firmware to determine whether the firmware file is a new or updated version of the corresponding firmware file in the computer firmware. If the system then determines that the firmware file is a new or updated version of the corresponding firmware file in the computer firmware, it can replace or update the corresponding firmware file in the computer firmware with the firmware file. On the other hand, if the system determines that the firmware module in the firmware file is a same or older version of the corresponding firmware module in the computer firmware, it can decide not to replace or update the corresponding firmware module in the computer firmware with the firmware module in the firmware file.

In some cases, the system can check or compare the firmware file versions and/or replace or update the corresponding firmware file in the computer firmware with the firmware file during a boot process of the system.

For security purposes, the system can also implement an encryption, signing, and/or validation or authorization mechanism for securing the firmware file and/or the computer firmware. For example, the system can sign and/or encrypt the firmware file and perform a validation or authorization step of the signed or encrypted firmware file prior to adding or storing the firmware file in the computer firmware volume, or prior to otherwise replacing or updating an existing firmware file with the firmware file. In some cases, the system can first create a message digest by applying a hash function (e.g., MD5, SHA, etc.) to the firmware file. In addition, the system can optionally encrypt the message digest with an encryption key, such as a private key for asymmetric encryption or a shared key for symmetric encryption. The system can then integrate the signed and/or encrypted message digest into the firmware file to generate a signed firmware file.

To validate or authorize the signed firmware file, the system can extract the firmware file and the message digest from the signed firmware file. If the message digest was previously encrypted, the system can then decrypt the message digest with a decryption key (e.g., same key used to encrypt if encryption is symmetric, or a public key if encryption is asymmetric). Next, the same hash function used to sign the firmware file can be applied to the firmware file extracted from the signed firmware file and the result can then be compared with the message digest extracted—and optionally decrypted—from the signed firmware file. If the comparison yields a match, then the firmware file can be validated or authorized. Thus, the system can then use the firmware file to update or modify the computer firmware. On the other hand, if the comparison does not yield a match, then the firmware file is not validated or authorized and, therefore, would not be used by the system to update or modify the computer firmware. By determining after the comparison that the firmware files do not match, the system can identify a potential compromise or hack attempt and avoid implementing unauthorized firmware files.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 8 illustrates an example method embodiment for updating computer firmware; and FIG. 9 illustrates an example method for securing the firmware file.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Disclosed are systems, methods, and non-transitory computer-readable storage media for updating computer firmware without flashing the entire firmware image. A brief introductory description of example systems and environments for updating computer firmware without flashing the entire firmware image are first disclosed herein. A detailed description of updating computer firmware without flashing the entire firmware image, including examples and variations, will then follow. These variations shall be described herein as the various embodiments are set forth. The disclosure now turns to FIGS. 1A and 1B.

Figure 1A:
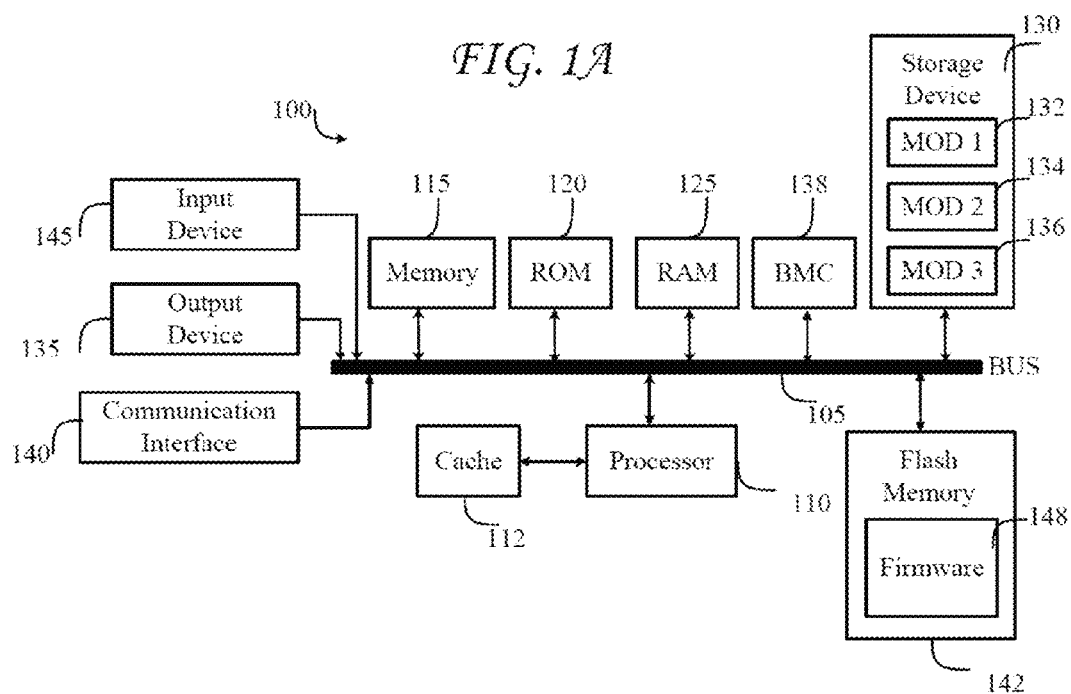
FIGS. 1A and 1B illustrate example system embodiments.
Figure 1B:
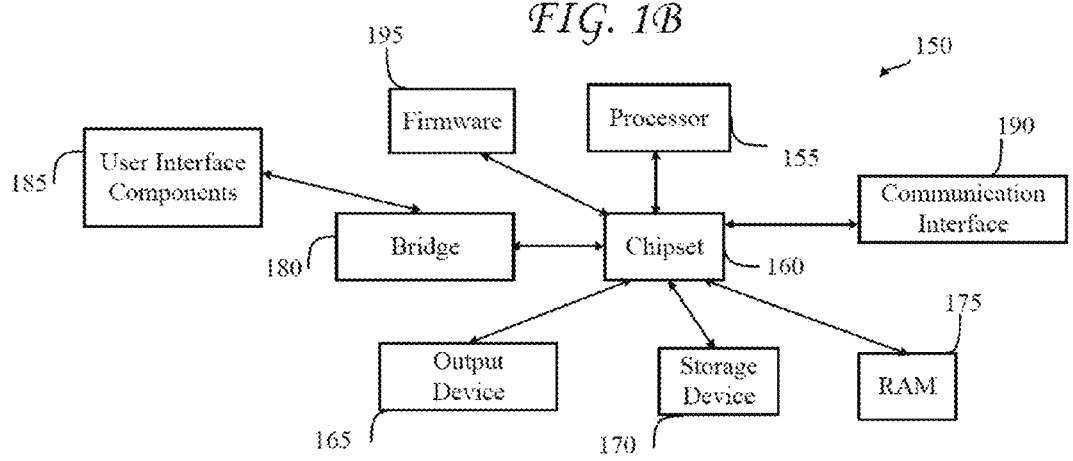

FIGS. 1A and 1B illustrate example system embodiments. The more appropriate embodiment will be apparent to those of ordinary skill in the art when practicing the present technology. Persons of ordinary skill in the art will also readily appreciate that other system embodiments are possible.

FIG. 1A illustrates a system bus computing system architecture 100 wherein the components of the system are in electrical communication with each other using a bus 105. Example system 100 includes a processing unit (CPU or processor) 110 and a system bus 105 that couples various system components including the system memory 115, such as read only memory (ROM) 170 and random access memory (RAM) 175, to the processor 110. The system 100 can include a cache of high-speed memory connected directly with, in close proximity to, or integrated as part of the processor 110. The system 100 can copy data from the memory 115 and/or the storage device 130 to the cache 112 for quick access by the processor 110. In this way, the cache can provide a performance boost that avoids processor 110 delays while waiting for data. These and other modules can control or be configured to control the processor 110 to perform various actions. Other system memory 115 may be available for use as well. The memory 115 can include multiple different types of memory with different performance characteristics. The processor 110 can include any general purpose processor and a hardware module or software module, such as module 1 132, module 2 134, and module 3 136 stored in storage device 130, configured to control the processor 110 as well as a special-purpose processor where software instructions are incorporated into the actual processor design. The processor 110 may essentially be a completely self-contained computing system, containing multiple cores or processors, a bus, memory controller, cache, etc. A multi-core processor may be symmetric or asymmetric.

To enable user interaction with the computing device 100, an input device 145 can represent any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems can enable a user to provide multiple types of input to communicate with the computing device 100. The communications interface 140 can generally govern and manage the user input and system output. There is no restriction on operating on any particular hardware arrangement and therefore the basic features here may easily be substituted for improved hardware or firmware arrangements as they are developed.

Storage device 130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 125, read only memory (ROM) 120, and hybrids thereof.

The storage device 130 can include software modules 132, 134, 136 for controlling the processor 110. Other hardware or software modules are contemplated. The storage device 130 can be connected to the system bus 105. In one aspect, a hardware module that performs a particular function can include the software component stored in a computer-readable medium in connection with the necessary hardware components, such as the processor 110, bus 105, display 135, and so forth, to carry out the function.

The BMC (baseboard management controller) 138 can be a specialized microcontroller or processor on the system 100. In some cases, the BMC 138 can be part of an Intelligent Platform Management Interface (IPMI). Moreover, in some cases, the BMC 138 can be embedded on a motherboard or main circuit board of the system 100. The BMC 138 can manage the interface between system management software and platform hardware. Different types of sensors built into the system 100 can report to the BMC 138 on parameters such as temperature, cooling fan speeds, power status, operating system (OS) status, and so forth. The BMC 138 can monitor the sensors and send alerts to an administrator via a network interface, such as communication interface 140, if any of the parameters do not stay within preset limits or thresholds, indicating a potential failure or error of the system 100. The administrator can also remotely communicate with the BMC 138 to take some corrective action, such as resetting or power cycling the system 100 to restore functionality.

Flash memory 142 can be an electronic non-volatile computer storage medium or chip which can be used by the system 100 for storage and/or data transfer. The flash memory 142 can be electrically erased and/or reprogrammed. Flash memory 142 can include erasable programmable read-only memory (EPROM), electrically erasable programmable read-only memory (EEPROM), ROM, NVRAM, or complementary metal-oxide semiconductor (CMOS), for example. The flash memory 142 can store the firmware 148 executed by the system 100 when the system 100 is first powered on, along with a set of configurations specified for the firmware 148. The flash memory 142 can also store configurations used by the firmware 148.

The firmware 148 can include a Basic Input/Output System or its successors or equivalents, such as an Extensible Firmware Interface (EFI) or Unified Extensible Firmware Interface (UEFI). The firmware 148 can be loaded and executed as a sequence program each time the system 100 is started. The firmware 148 can recognize, initialize, and test hardware present in the system 100 based on the set of configurations. The firmware 148 can perform a self-test, such as a Power-on-Self-Test (POST), on the system 100. This self-test can test functionality of various hardware components such as hard disk drives, optical reading devices, cooling devices, memory modules, expansion cards and the like. The firmware 148 can address and allocate an area in the memory 115, ROM 120, RAM 125, and/or storage device 130, to store an operating system (OS). The firmware 148 can load a boot loader and/or OS, and give control of the system 100 to the OS.

The firmware 148 of the system 100 can include a firmware configuration that defines how the firmware 148 controls various hardware components in the system 100. The firmware configuration can determine the order in which the various hardware components in the system 100 are started. The firmware 148 can provide an interface, such as an UEFI, that allows a variety of different parameters to be set, which can be different from parameters in a firmware default configuration. For example, a user (e.g., an administrator) can use the firmware 148 to specify clock and bus speeds, define what peripherals are attached to the system 100, set monitoring of health (e.g., fan speeds and CPU temperature limits), and/or provide a variety of other parameters that affect overall performance and power usage of the system 100.

While firmware 148 is illustrated as being stored in the flash memory 142, one of ordinary skill in the art will readily recognize that the firmware 148 can be stored in other memory components, such as memory 115 or ROM 120, for example. However, firmware 148 is illustrated as being stored in the flash memory 142 as a non-limiting example for explanation purposes.

FIG. 1B illustrates an example computer system 150 having a chipset architecture that can be used in executing the described method(s) or operations, and generating and displaying a graphical user interface (GUI). Computer system 150 can include computer hardware, software, and firmware that can be used to implement the disclosed technology. System 150 can include a processor 155, representative of any number of physically and/or logically distinct resources capable of executing software, firmware, and hardware configured to perform identified computations. Processor 155 can communicate with a chipset 160 that can control input to and output from processor 155. In this example, chipset 160 outputs information to output 165, such as a display, and can read and write information to storage device 170, which can include magnetic media, and solid state media, for example. Chipset 160 can also read data from and write data to RAM 175. A bridge 180 for interfacing with a variety of user interface components 185 can be provided for interfacing with chipset 160. Such user interface components 185 can include a keyboard, a microphone, touch detection and processing circuitry, a pointing device, such as a mouse, and so on. In general, inputs to system 150 can come from any of a variety of sources, machine generated and/or human generated.

Chipset 160 can also interface with one or more communication interfaces 190 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 155 analyzing data stored in storage 170 or 175. Further, the machine can receive inputs from a user via user interface components 185 and execute appropriate functions, such as browsing functions by interpreting these inputs using processor 155.

Moreover, chipset 160 can also communicate with firmware 195, which can be executed by the computer system 150 when powering on. The firmware 195 can recognize, initialize, and test hardware present in the computer system 150 based on a set of firmware configurations. The firmware 195 can perform a self-test, such as a POST, on the system 195. The self-test can test functionality of the various hardware components 155-190. The firmware 195 can address and allocate an area in the memory 175 to store an OS. The firmware 195 can load a boot loader and/or OS, and give control of the system 150 to the OS. In some cases, the firmware 195 can communicate with the hardware components 155-190. Here, the firmware 195 can communicate with the hardware components 155 and 165-190 through the chipset 160 and/or through one or more other components. In some cases, the firmware 195 can communicate directly with the hardware components 155-190.

It can be appreciated that example systems 100 and 150 can have more than one processor 110 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described herein.

Figure 2:
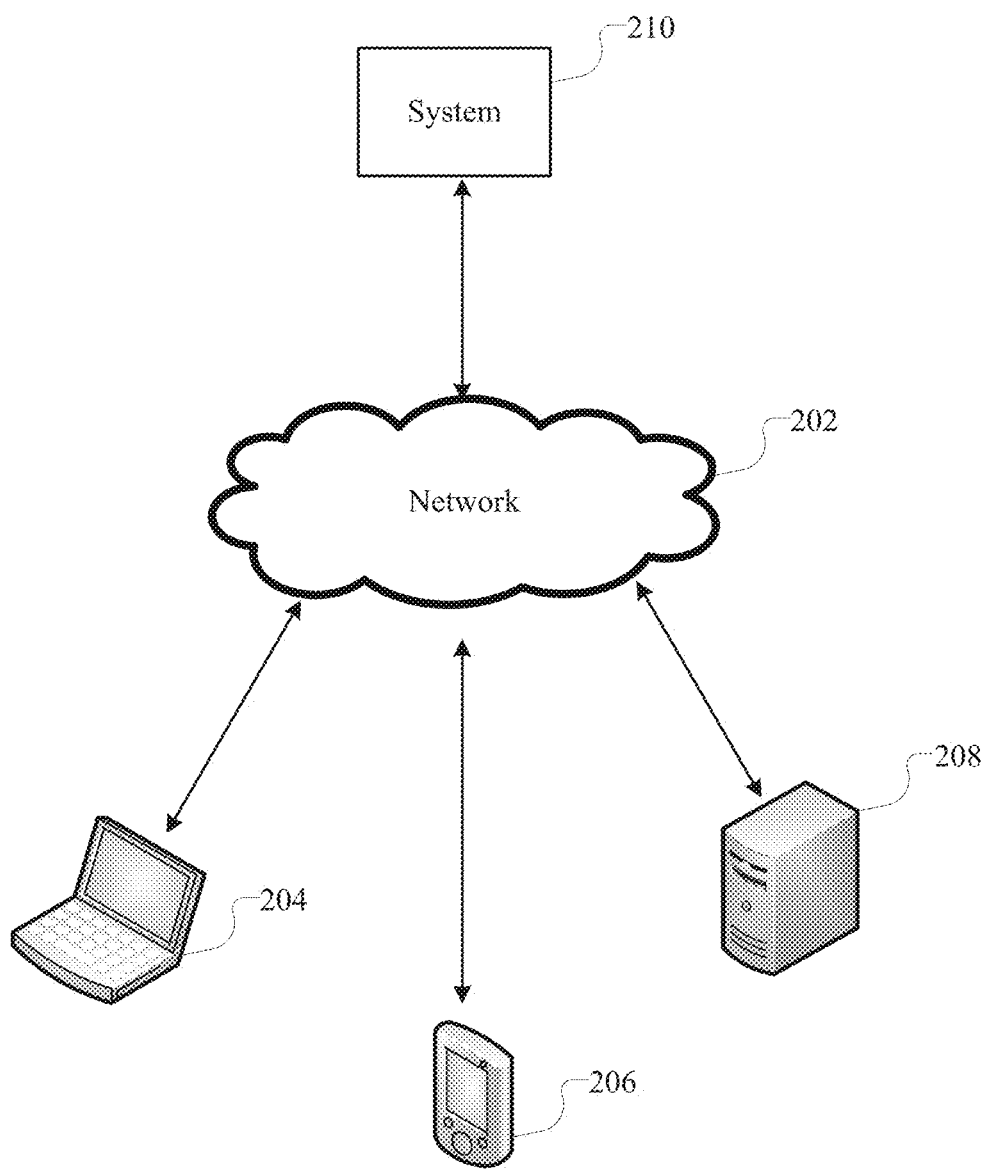
FIG. 2 illustrates a block diagram of an example environment for upgrading computer firmware through a network.

FIG. 2 illustrates a block diagram 200 of an example environment for upgrading computer firmware through a network 202. System 210 can add, upgrade, and/or replace firmware modules (e.g., firmware files) on remote devices 204-208 via network 202. For example, system 210 can transmit one or more firmware modules and/or instructions to remote devices 204-208 for adding, upgrading, and/or replacing firmware modules for the computer firmware on the remote devices 204-208. The remote devices 204-208 can include client devices, such as laptop computers, desktop computers, tablet computers, smartphones, etc.; servers; network devices, such as switches or routers; or any other computing devices. In some cases, system 210 can transmit a firmware module, with or without installation instructions, to one or more of the remote devices 204-208, and trigger the remote devices 204-208 having received the firmware module to add or install the firmware module on the computer firmware at the specific remote device.

In other cases, the system 210 can transmit a firmware modification instruction to one or more of the remote devices 204-208, to trigger the one or more remote devices 204-208 to add, upgrade, or replace a firmware module on the computer firmware at the specific remote device. For example, the system 210 can transmit an instruction specifying that firmware module X should be installed on remote device 204. Remote device 204 can receive the instruction and, in response, initiate an installation of firmware module X on remote device 204. Here, if remote device 204 already has a copy of firmware module X, it can simply perform the installation based on the instruction from system 210. On the other hand, if remote device 204 does not have a copy of the firmware module X, it can then request and/or obtain the firmware module X from system 210 and/or any other device. In some cases, the instruction from system 210 can specify a location(s) where remote device 204 may seek and obtain the firmware module X for installation. In other cases, the remote device 204 can have a configured setting specifying one or more locations where it can request or download the firmware module X and/or any other firmware module for installation at the remote device 204.

The instruction from system 210 can include a trigger for initiating a firmware upgrade, install, and/or modification. The instruction from system 210 can also identify one or more firmware modules to be added, upgraded, and/or replaced by the remote device that receives the instruction. Moreover, the instruction from system 210 can include instructions indicating how a specific firmware module is to be added, upgraded, and/or replaced. If the instruction from system 210 is not accompanied by a specific firmware module to be installed by the receiving device, the instruction can include one or more addresses specifying where the receiving device may download or request the specific firmware module to be installed on the receiving device. Further, the instruction can outline how the receiving device is to assemble the computer firmware with the new, added, or replaced firmware module.

The instruction can also outline how the receiving device is to treat a new firmware module set to upgrade or replace an existing firmware module on the receiving device. For example, if the existing firmware module is of a same kind as the new firmware module (e.g., if the existing and new firmware modules have matching identifiers, functionalities, or characteristics), the instruction can indicate that a version check should be performed and the existing firmware module replaced with the new firmware module if the new firmware module is a higher or newer version of the existing firmware module or if the new firmware module fixes a problem with the existing firmware module.

The instruction from system 210 can also include security information, such as signature(s), encryption/decryption key(s), validation rules, and/or security instructions. Moreover, the instruction from system 210 can include other parameters, such as installation parameters, file type parameters, file name parameters, metadata, rules, firmware settings, etc.

As previously mentioned, system 210 can transmit firmware module(s) and/or instruction(s) to remote devices 204-208 for adding, replacing, and/or upgrading one or more firmware modules via network 202. Network 202 can include one or more physical and/or logical networks. Moreover, network 202 can include a private network, such as a local area network (LAN) or a wireless LAN (WLAN); a public network such as the Internet or a wide area network (WAN); and/or a hybrid network, such as a virtual private network (VPN). Further, remote devices 204-208 can reside on one or more networks and/or data centers. For example, remote devices 204-206 can reside on a specific virtual LAN (VLAN), and remote device 208 can reside on the same or a different network segment, such as a different VLAN, LAN, or data center. In some cases, system 210 can reside on the same physical or logical network or network segment as one or more of the remote devices 204-208. However, in other cases, system 210 may reside on a different physical or logical network or network segment as the remote devices 204-208.

System 210 and remote devices 204-208 can be any computing device with networking capabilities, such as a laptop, server, tablet computer, smartphone, and so forth. For example, system 210 and remote device 208 can be separate servers, while remote devices 204-206 can be client devices. In some embodiments, system 210 can be a server or switch for remotely modifying the computer firmware on remote devices 204-208. In other embodiments, system 210 can be a client device which a user can use to modify computer firmware on the remote devices 204-208. In some cases, system 210 can monitor computer firmware versions and upgrades and trigger any modifications to the computer firmware on the remote devices 204-208.

Moreover, system 210 can monitor different types or versions of computer firmware for each of the remote devices 204-208, and/or trigger any upgrade, installation, or replacement of the computer firmware at each of the remote devices 204-208. For example, system 210 can trigger an installation of a server firmware module on remote device 208 which can be specific for a type of server and/or server hardware, as well as a client firmware module on remote device 204 which can be specific for a type of client computer and/or computer hardware. As another example, system 210 can trigger an upgrade of a computer firmware at remote device 206 to a specific version and an upgrade of a computer firmware at remote device 208 to a different version.

Figure 3:
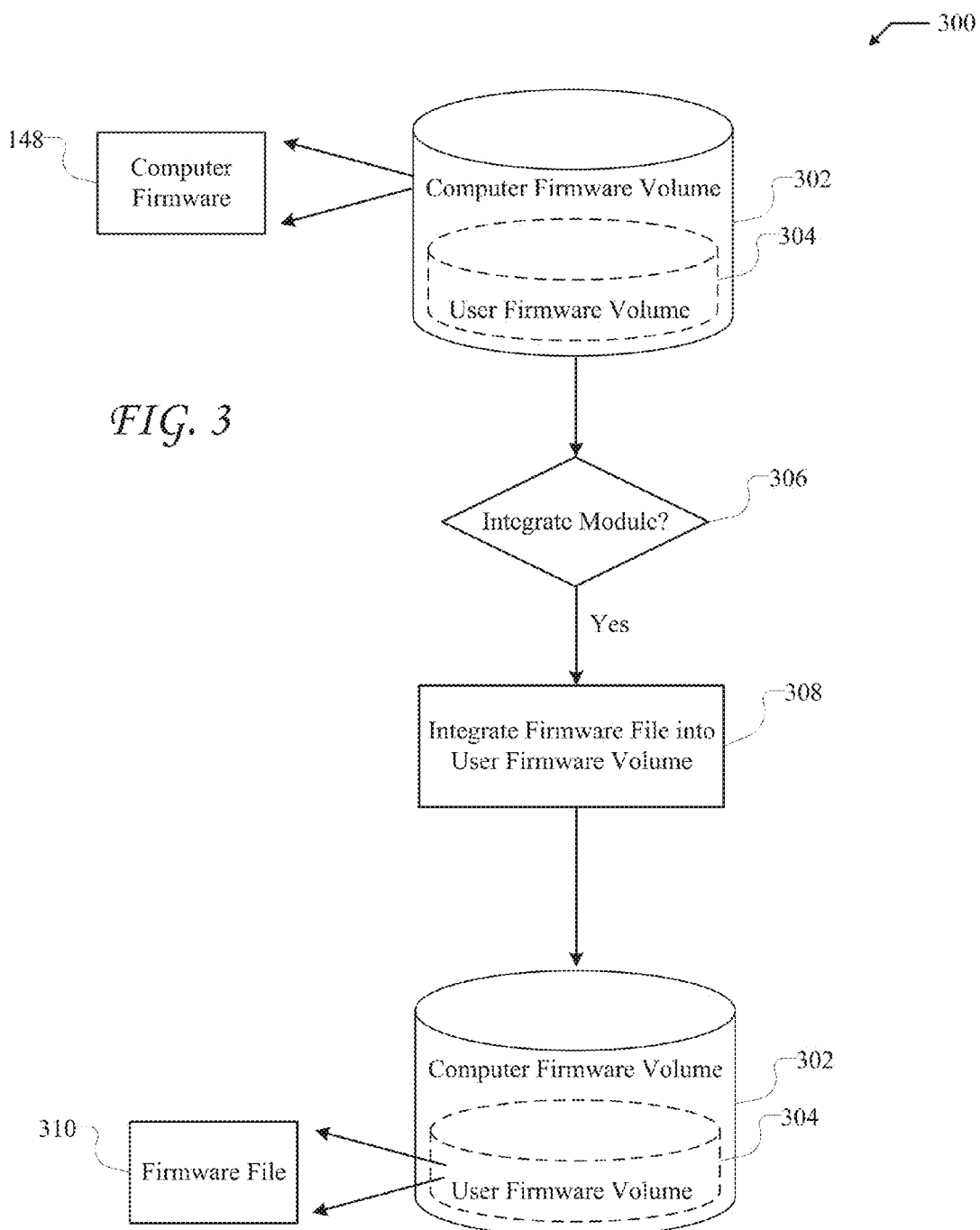
FIG. 3 illustrates a schematic diagram of an example flowchart for integrating firmware files into a computer firmware volume.

FIG. 3 illustrates a schematic diagram 300 of an example flowchart for integrating firmware files into a computer firmware volume 302. The computer firmware volume 302 can include a filesystem or storage on system 100 used by system 100 to store the computer firmware 148 for the system 100. The computer firmware volume 302 can include methods, data structures, partition(s), and/or disk(s) on a memory device, such as a flash memory 148, on the system 100 for storing or maintaining the computer firmware 148. In some embodiments, the computer firmware volume 302 can store the computer firmware 148 as an image and/or specific modules, segments, portions, functions, files, and/or firmware of the computer firmware 148.

The system 100 can create a user firmware volume 304 in the computer firmware volume 302 for storing firmware contents, such as firmware files or modules, added, upgraded, replaced, or installed by a user or system 100. The user firmware volume 304 can be a portion, segment, or partition of the computer firmware volume 302. Moreover, the user firmware volume 304 can be on the same disk, partition, or memory device as the computer firmware volume 302. However, in some embodiments, the user firmware volume 304 can be on a different disk, partition, or memory device as the computer firmware volume 302. Further, in some cases, the user firmware volume 304 can span multiple partitions, disks, filesystems, or memory devices. Here, the user firmware volume 304 can be on the same partitions, disks, filesystems, or memory devices as the computer filesystem volume, but may otherwise span one or more different partitions, disks, filesystems, or memory devices.

At step 306, the system 100 checks if there is a firmware file (e.g., firmware module) to be integrated into the computer firmware 148. If there is a firmware file to be integrated into the computer firmware 148, at step 308 the system 100 integrates the firmware file 310 (i.e., the firmware file that needs to be integrated into the computer firmware 148) into the user firmware volume 304. Thus, the firmware file 310 can be integrated into the user firmware volume 304 within the computer firmware volume 302, which consequently updates and/or modifies the computer firmware 148 on the system 100. In some cases, the firmware file 310 can be a new firmware module added to the computer firmware 148. However, in other cases, the firmware file 310 can replace an existing firmware module on the computer firmware 148. Here, the system 100 can perform a check or comparison of versions between the firmware file 310 and the existing firmware module before replacing the existing firmware module. For example, the system 100 can compare the global unique identifier (GUID) of the firmware file 310 with the GUID of the existing module to determine if the two correspond to the same firmware module and which firmware module is the newer module and should be kept as part of the computer firmware 148.

Figure 4:
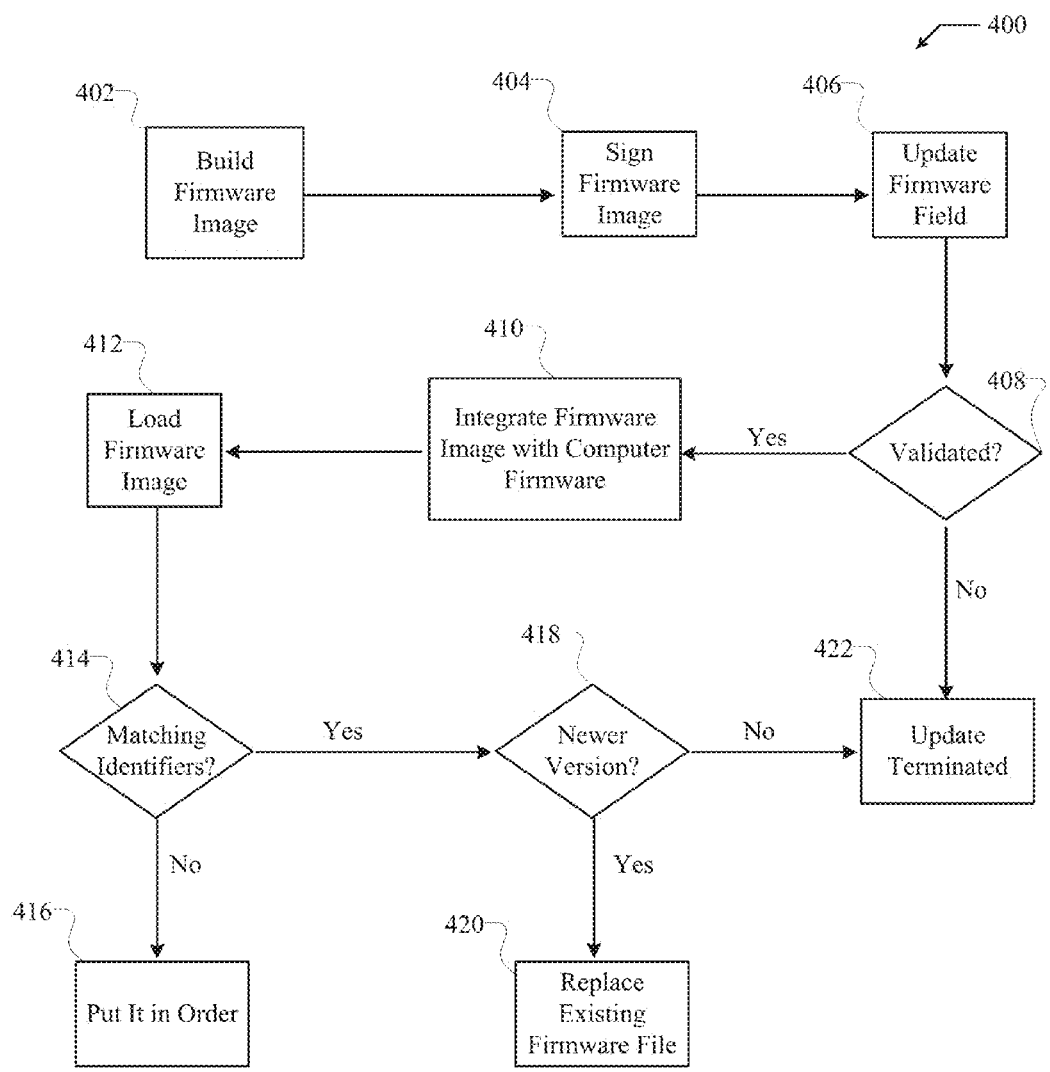
FIG. 4 illustrates a flowchart of an example mechanism for deploying computer firmware on a system.

FIG. 4 illustrates a flowchart 400 of an example mechanism for deploying computer firmware on a system 100. At step 402, a firmware image to be integrated into computer firmware is generated. The firmware image can include a firmware file and/or module. Moreover, the firmware image can include a logical volume, such as a user firmware volume, which can be integrated into the computer firmware volume hosting the current computer firmware. Thus, the firmware image can include the firmware module as well as the file system or logical structure to be integrated into the computer firmware and/or computer firmware volume.

At step 404, the firmware image can be signed for security purposes. In some cases, a hash function (e.g., MD5 or SHA) can be applied to the firmware image to generate a message digest. The message digest can, in some cases, be encrypted with an encryption key for further security to form an encrypted message digest.

At step 408, the signed firmware image can be validated. In some cases, the validation can include extracting the contents from the signed firmware image, applying the same hash function to the extracted firmware image, and comparing the message digest with the results of the application of the same hash function to the extracted firmware image. Here, if the comparison yields a match, then the signed firmware image can be validated, else the signed firmware image is not validated and can be deemed unauthorized.

If the signed firmware image is not validated, at step 422 the update can be denied. On the other hand, if the signed firmware image is validated, at step 410 the firmware image can be integrated with the computer firmware. For example, the firmware image can be extracted from the signed firmware image and integrated into a user firmware volume created within the computer firmware volume for the computer firmware. In some cases, the firmware image can include a corresponding version of the user firmware volume within the computer firmware volume and, therefore, the firmware image can be integrated into the user firmware volume within the computer firmware. When integrating the firmware image with the computer firmware, the user firmware volume within the computer firmware can be flashed to integrate the firmware file(s) and/or module(s) in the firmware image into the computer firmware.

At step 412, the firmware image can be loaded from the computer firmware. The firmware image can be loaded during, or as part of, the boot process of a given system. At step 414, the firmware image is compared with firmware file(s) and/or module(s) in the computer firmware to determine if the firmware image has an identifier matching a corresponding identifier of any of the other firmware file(s) and/or module(s) in the computer firmware. In other words, the identifier of the firmware image can be checked along with the identifiers of the remaining firmware files or modules in the computer firmware to determine if the firmware image is a duplicate of any of the remaining firmware files or modules. Matching identifiers can indicate that the firmware image is a new firmware file or module or otherwise corresponds to an existing firmware file or module in the computer firmware.

The identifiers can refer to any attribute, file, characteristic, key, name, metadata, or information that provides an identity of a respective firmware file, module, and/or image. For example, in some cases, the identifier can refer to global unique identifiers (GUID) for the firmware files or modules. Thus, the GUID of the firmware image can be compared with GUIDs of existing firmware contents in the computer firmware to determine if the firmware image already exists in the computer firmware.

At step 416, if the identifier of the firmware image does not match any of the identifiers of the firmware files or modules in the computer firmware, the firmware image is placed in proper execution order in the computer firmware. In other words, the components, files, modules, and/or drivers of the computer firmware are placed in a correct execution order to account for dependencies of the different components, files, modules, and/or drivers in the computer firmware. In some cases, this ordering or organizing can be performed by one or more module or driver dispatchers, such as a PEI/DXE dispatcher.

On the other hand, if the identifier of the firmware image matches another identifier corresponding to an existing firmware file or module in the computer firmware, at step 418 a version check is performed to determine if the firmware image is a newer version than the existing firmware file or module. The version check can be performed by comparing the firmware files or modules, comparing file or module identifiers, comparing version identifiers, comparing metadata, comparing timestamps, comparing attributes, comparing firmware contents, comparing filenames, or comparing any other relevant information associated with the firmware image and the existing firmware file or module.

After the version check, if the firmware image is determined to be a newer version of the existing firmware file or module, at step 420, the firmware image can replace the existing firmware file or module in the computer firmware. Alternatively, at step 422, the update can be terminated.

In some cases, system 100 can perform any of steps 402-422 during the execution of the computer firmware and/or a booting process. For example, the system 100 can perform one or more of the steps 402-422 during a booting process of system 100 and return to the booting process and/or firmware POST after the mechanism of flowchart 400 has been completed. Thus, system 100 can dynamically integrate new modules into the computer firmware and/or replace existing modules in the computer firmware during the booting process. In some cases, the system 100 can load and execute the modules from the firmware image dynamically as the system 100 starts. Indeed, the system 100 can perform any of steps 402-422 prior to control of the system 100 is passed from the computer firmware to an operating system (OS) or a boot loader.

Figure 5:
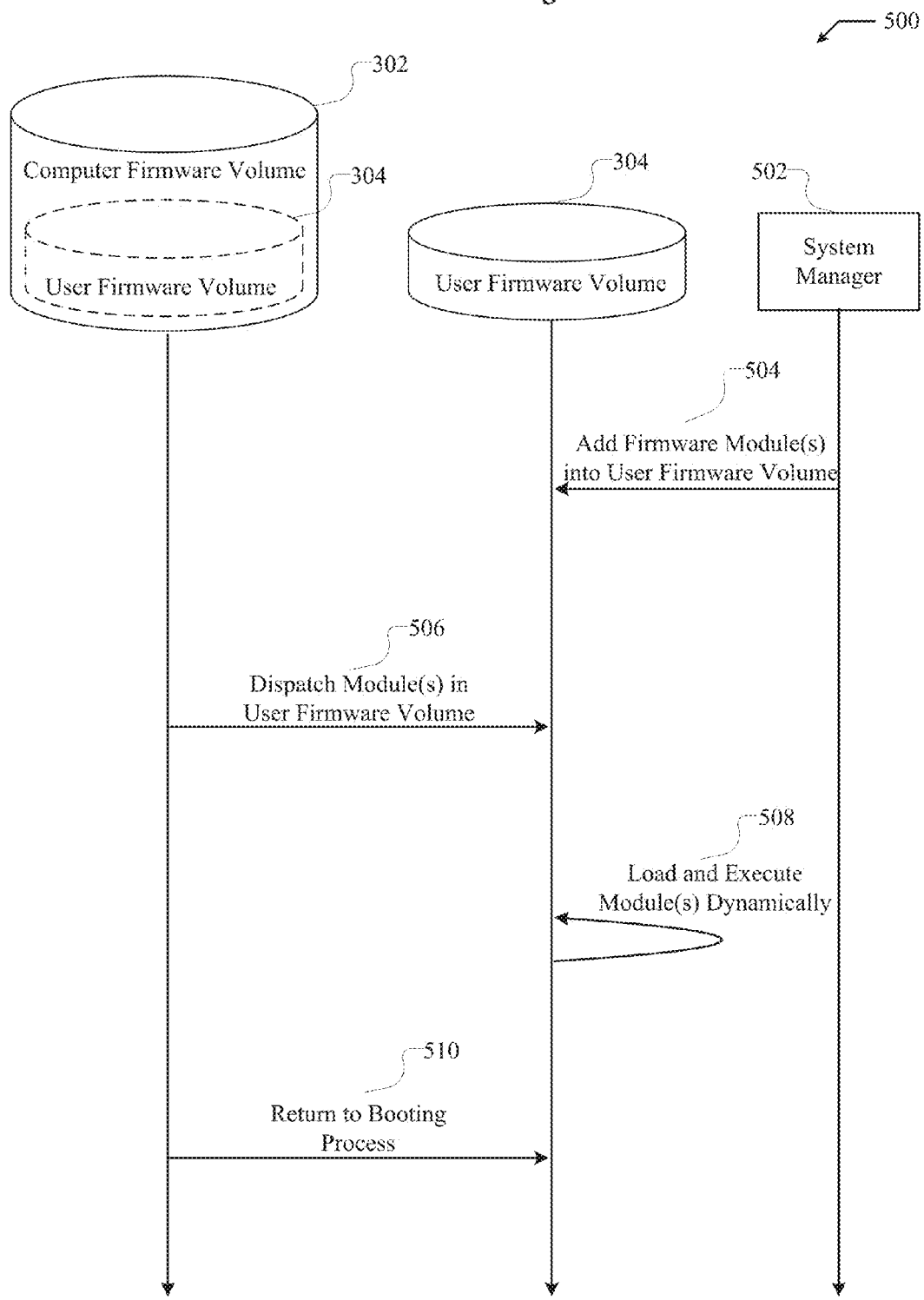
FIG. 5 illustrates a schematic diagram of a flow of interactions between a computer firmware and a system manager.

FIG. 5 illustrates a schematic diagram 500 of a flow of interactions between the computer firmware 302 and a system manager 502. The system manager 502 can be a management module or firmware interface. For example, the management module can be an administrative interface or environment for accessing administrative functions for the system, such as a console or the like. However, in some embodiments, the system manager 502 can be a management module or application on a remote device, such as a remote server.

The system manager 502 can add a module into the user firmware volume 304 (504). The firmware module can be a new module or a replacement/upgrade of an existing module in the computer firmware volume 302. As previously explained, the user firmware volume 304 can include a filesystem, file, volume, and/or an image created for integrating firmware modules and/or files into the computer firmware volume 302, which contains the computer firmware.

The computer firmware in the computer firmware volume 302 can then dispatch the module(s) in the user firmware module 304 (506). In some cases, the module(s) in the user firmware module 304 can be dispatched by a BIOS or UEFI component. For example, the module(s) in the user firmware module 304 can be dispatched by a pre-EFI (PEI) initialization and/or driver execution environment (DXE) dispatcher associated with the UEFI platform initialization (PI) specification.

Next, the system 100 can load and execute the module(s) dynamically (508). For example, the module(s) can be loaded and executed during, or as part of, the booting process of the system 100. After the module(s) is loaded and executed, the system 100 can return to the booting process (510). Here, control can be handed back to the computer firmware to complete the boot process and/or POST, or otherwise provide control to the OS or boot loader.

Figure 6:
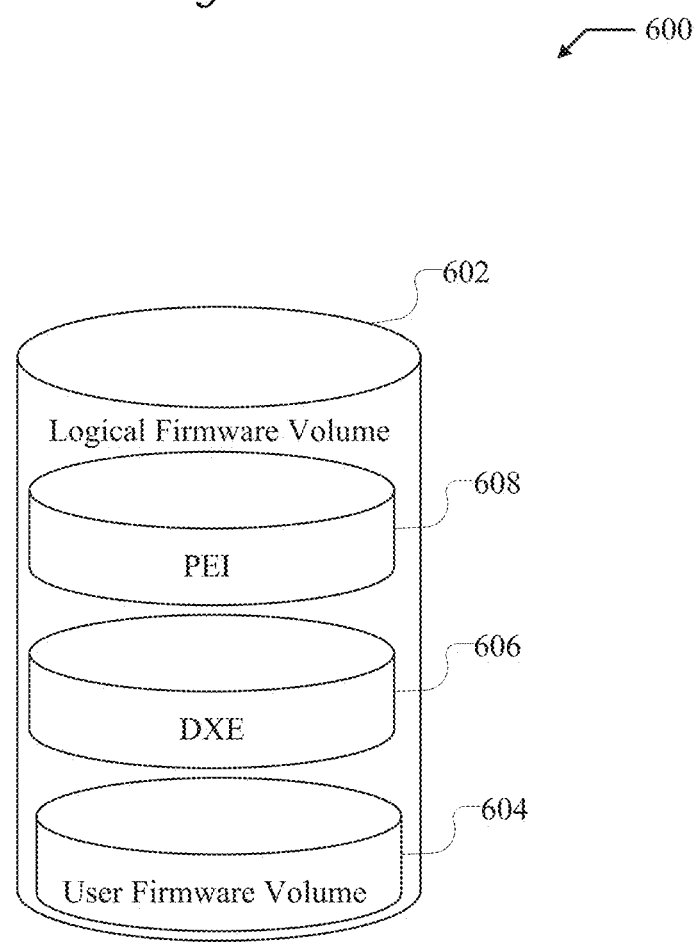
FIG. 6 illustrates an example of a logical firmware device.

FIG. 6 illustrates an example of a logical firmware device 600. The logical firmware device 600 can include firmware volumes 604-608 for storing firmware contents associated with the computer firmware for a given device. Each of the firmware volumes 604-608 can represent a storage repository for data and/or code according to the UEFI PI specification. However, in other embodiments, each of the firmware volumes 604-608 can be according to other firmware platforms or specifications, such as BIOS or any other firmware platform or specifications, including future firmware platforms or specifications.

Each of the firmware volumes 604-608 can be organized into a filesystem. Thus, a file can be used as a unit of storage for each of the firmware volumes 604-608.

User firmware volume 604 can include a firmware volume created to allow a user or device to deploy firmware files and/or modules, replace or upgrade existing firmware files and/or modules, etc. The user firmware volume 604 can thus allow firmware files and/or modules to be integrated into the computer firmware in the logical firmware volume 602 without requiring the entire computer firmware in the logical firmware volume 602 to be flashed.

The DXE firmware volume 606 can include a firmware volume for the DXE components, modules, files, and/or stages of the UEFI. For example, the DXE firmware volume 606 can include any DXE drivers, dispatchers, and/or modules in UEFI-based computer firmware.

The PEI firmware volume 608 can include a firmware volume for the PEI components, modules, files, and/or stages of the UEFI. For example, the PEI firmware volume 608 can include any PEI drivers, dispatchers, and/or modules in UEFI-based computer firmware.

Figure 7:
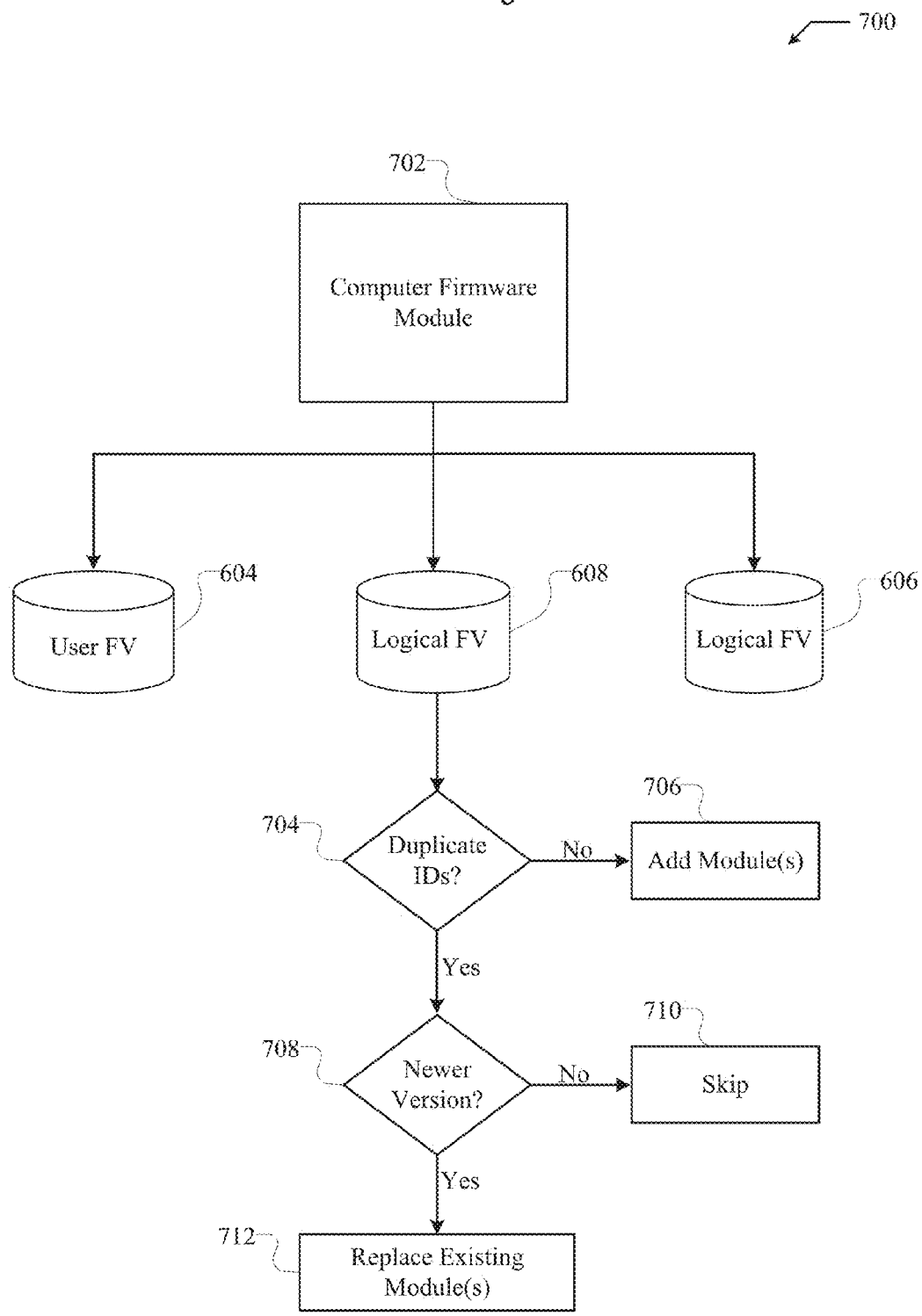
FIG. 7 illustrates a diagram of an example process for updating computer firmware.

FIG. 7 illustrates a diagram of an example process 700 for updating computer firmware. A computer firmware module 702 on a system can compare user firmware volume 604 with logical firmware volumes 606-608. The computer firmware module 702 can refer to the computer firmware on the given system, or one or more specific modules, functions, files, or elements of the computer firmware in the given system. For example, in some embodiments, the computer firmware module 702 can be a PEI and/or DXE dispatcher in a UEFI platform or environment. In other embodiments, the computer firmware module 702 can be the BIOS of the given system.

In comparing the user firmware volume 604 with logical firmware volumes 606-608, the computer firmware module 702 can compare any of the contents, such as modules or files, of the user firmware volume 604 with any contents of logical firmware volumes 606-608. The computer firmware module 702 can compare user firmware volume 604 with logical firmware volumes 606-608 in order to determine whether the user firmware volume 604 and/or any of its contents match the logical firmware volumes 606-608 and/or any of their contents.

To determine if the user firmware volume 604 matches the logical firmware volumes 606-608, at step 704 the computer firmware module 702 can check if the user firmware volume 604 and the logical firmware volumes 606-608 have matching or duplicate identifiers. The identifiers can be any tag, label, attribute, or information identifying the respective volumes 604-608 and/or any modules or files in each of the volumes 604-608. For example, the identifiers can be global unique identifiers (GUIDs) associated with each of the modules or files in the volumes 604-608. Here, the computer firmware module 702 can compare the GUIDs of any specific modules or files in the user firmware volume 604 with the GUIDs of the modules or files in the logical firmware volumes 606-608. By checking the identifiers, the computer firmware module 702 can determine if the user firmware volume 604 or any of its contents match (i.e., are the same as or equivalent to) the logical firmware volumes 606-608 or any of their contents.

At step 706, if the user firmware volume 604 does not match the logical firmware volumes 606-608 or any of their contents, the computer firmware module 702 can add or integrate the user firmware volume 604 to the logical firmware volumes 606-608 or any other logical volume associated with the computer firmware of the given system. In some cases, the computer firmware module 702 at step 706 can add or integrate the user firmware volume 604 into the computer firmware (e.g., into any of the logical firmware volumes 606-608) without flashing the computer firmware associated with logical firmware volumes 606-608.

At step 708, if the user firmware volume 604 does match any of the logical firmware volumes 606-608, the computer firmware module 702 can then check at step 708 if the user firmware volume 604 is a newer version of any of the logical firmware volumes 606-608. For example, the computer firmware module 702 can determine that the user firmware volume 604 is a newer version of the logical firmware volumes 606-608 or otherwise contains one or more modules that are a newer version of one or more modules in the logical firmware volumes 606-608.

At step 710, if the user firmware volume 604 is not a newer version of any of the logical firmware volumes 606-608, the computer firmware module 702 can skip the integration of the user firmware volume 604 into the logical firmware volumes 606-608 or otherwise end the process 700

On the other hand, at step 712, if the user firmware volume 604 is a newer version of any of the logical firmware volumes 606-608, the computer firmware module 702 can replace the existing version of the user firmware volume 604 in the logical firmware volumes 606-608 with the newer module (i.e., the user firmware volume 604). In some cases, the computer firmware module 702 at step 712 can replace the existing version without flashing the computer firmware associated with logical firmware volumes 606-608.

While the process 700 is described above with respect to the user firmware volume 604 and logical firmware volumes 606-608, one of ordinary skill in the art will readily recognize that any of the steps or concepts in process 700 can be performed for specific firmware modules or files as opposed to, or in addition to, volumes. For example, steps 704 and 708 can be implemented for checking duplicate identifiers and comparing versions for one or more modules or files in the user firmware volume 604 and the logical firmware volumes 606-608. Moreover, steps 706 and 712 can be implemented to add, integrate, or replace specific modules or files in the computer firmware of a given system. In other words, steps 702-712 can be performed for the entire volumes 604-608 or specific modules or files in the volumes 604-608.

Having disclosed some basic system components and concepts, the disclosure now turns to the example method embodiments shown in FIGS. 8 and 9. For the sake of clarity, the method in FIG. 8 is described in terms of system 100, as shown in FIG. 1, configured to practice the method, and the method in FIG. 9 is described in terms of system 210 and server 208, as shown in FIG. 2, configured to practice the method. The steps outlined herein are exemplary and can be implemented in any combination thereof, including combinations that exclude, add, or modify certain steps.

FIG. 8 illustrates an example method 800 for updating computer firmware 148. Here, the system 100 can update (e.g., add, install, replace, remove, or integrate firmware contents) computer firmware 148 without flashing the entire computer firmware 148. In some embodiments, the system 100 can generate a user firmware volume within a computer firmware volume containing computer firmware used by the system 100 during a boot process (802). The user firmware volume can include, for example, a file system, a logical volume, a file, a module, an image, a package, or any other content or storage element. Moreover, the computer firmware used by the system 100 can include any type of firmware used by a device prior to, or during, a boot process. For example, the computer firmware can include a BIOS, UEFI firmware, or any other type of firmware and/or firmware interface. The boot process can include the process for testing, detecting, and/or initiating hardware components; loading configuration settings for the system 100, such as performance and hardware configuration settings; loading drivers, such as PEI and/or DXE drivers; handing control of the system 100 to an OS or boot loader; and so forth.

The system 100 can also obtain a firmware file for updating the computer firmware used by the system 100 during the boot process (804). The firmware file can include, for example, one or more modules, files, volumes (e.g., a user firmware, ROM, or logical volume), filesystems, images, a package, etc. Moreover, the firmware file can be generated, compiled, or created by the system 100. In some cases, however, the firmware file can be generated, compiled, or created by a separate system, such as a server, and later received by the system 100 for checking and/or integration into the computer firmware of the system 100.

Next, the system 100 can compare the firmware file with a content of the computer firmware volume (806). For example, the system 100 can compare attributes, identifiers (e.g., GUIDs), labels, metadatas, or contents of the firmware file and any firmware files in the computer firmware volume, including any modules or volumes, to determine if the firmware file is already installed or integrated in the computer firmware. In some cases, if the system 100 determines after the comparison that the firmware file is already installed or integrated in the computer firmware, the system 100 can then perform a version check to determine if the firmware file is a newer version of the existing, corresponding firmware file in the computer firmware. Here, the system 100 can identify the version of the firmware file and the version(s) of any corresponding, existing firmware files in the computer firmware to determine which firmware file(s) are newer. If the system 100 then determines that the firmware file is a newer version of the corresponding, existing firmware file(s) in the computer firmware, the system 100 can then perform step 808 as further explained below.

On the other hand, if the system 100 determines that the firmware file is a same or older version of the corresponding, existing firmware file(s) in the computer firmware, the system 100 can skip step 808. However, in some cases, the system 100 may still continue to step 808 after determining that the firmware file is a same or older version of the corresponding, existing firmware file(s) in the computer firmware. For example, the system 100 may want to replace a corrupt firmware file in the computer firmware and thus may continue to step 808 even if one or more firmware files in the computer firmware are the same (i.e., same file and version) as the firmware file. As another example, the system 100 may want to revert one or more firmware files in the computer firmware to an older version (e.g., if an update to a firmware file causes a problem or error with the computer firmware) and thus may continue to step 808 even if one or more firmware files in the computer firmware constitute a newer version of the firmware file.

Based on the comparison, the system 100 then stores the firmware file on the user firmware volume within the computer firmware volume without flashing an entire portion of the computer firmware used by the system 100 during the boot process (808). The system 100 can add, install, or load the firmware file as a new module, file, or component of the computer firmware, or replace an existing module, file, or component in the computer firmware with the firmware file, all without flashing the entire computer firmware. Moreover, the system 100 can load, execute, or store the firmware file dynamically as the system 100 is started, during a boot process. Further, the firmware file can be stored permanently such that the firmware file remains a part of the computer firmware after the system 100 is shutdown and/or restarted. However, in some embodiments, the firmware file may be temporarily stored in the computer firmware volume such that the firmware file is loaded during, or as part of, a boot process but is not maintained in the computer firmware volume after the system 100 is shutdown or restarted.

The system 100 can store the firmware file in-band or out-of-band. When storing the firmware file out-of-band, the system 100 can use a dedicated channel, device, controller, or environment, such as a BMC, to store the firmware file. For example, the BMC can store the firmware file on the system 100 based on a command received from a remote server. In some cases, the firmware file can be stored out-of-band even if the system 100 is not powered on or if the OS on the system 100 is not otherwise installed, running, or functional. On the other hand, when storing the firmware file in-band, the system 100 can store the firmware file while the OS has been booted. For example, the firmware file can be stored on the system 100 based on a command from a remote server received by the system 100 over a network while the system 100 is booted.

In some embodiments, the system 100 can perform one or more of the steps in method 800, described above, during a boot process of the system 100.

While the firmware file in step 808 is stored on the user firmware volume, the firmware file may be stored in other volumes associated with the computer firmware either in addition to the firmware file being stored in the user firmware volume or in lieu of the firmware file being stored in the user firmware volume. For example, in some embodiments, the firmware file may be stored in a different firmware volume associated with the computer firmware, such as logical volumes 606-608 illustrated in FIG. 6, with or without the firmware file being also stored in the user firmware volume.

For security purposes, the system 100 can implement an encryption, signing, and/or validation or authorization mechanism for securing the firmware file and/or computer firmware. For example, the system 100 can sign and/or encrypt the firmware file and perform a validation or authorization step of the signed or encrypted firmware file prior to adding or storing the firmware file in the computer firmware volume, or prior to otherwise replacing or updating an existing firmware file with the firmware file. In some cases, the system 100 can first create a message digest by applying a hash function (e.g., MD5, SHA, etc.) to the firmware file. In addition, the system 100 can optionally encrypt the message digest with an encryption key, such as a private key for asymmetric encryption or a shared key for symmetric encryption. The system 100 can then integrate the signed and/or encrypted message digest into the firmware file to generate a signed firmware file.

To validate or authorize the signed firmware file, the system 100 can extract the firmware file and the message digest from the signed firmware file. If the message digest was previously encrypted, the system 100 can then decrypt the message digest with a decryption key (e.g., same key used to encrypt if encryption is symmetric, or a public key if encryption is asymmetric). Next, the same hash function used to sign the firmware file can be applied to the firmware file extracted from the signed firmware file and the result can then be compared with the message digest extracted—and optionally decrypted—from the signed firmware file. If the comparison yields a match, then the firmware file can be validated or authorized. Thus, the system 100 can then use the firmware file to update or modify the computer firmware. On the other hand, if the comparison does not yield a match, then the firmware file is not validated or authorized and, therefore, would not be used by the system 100 to update or modify the computer firmware. By determining after the comparison that the firmware files do not match, the system 100 can identify a potential compromise or hack attempt and avoid implementing unauthorized firmware files.

While the various steps described above, including steps 802-808, are described as being performed by the same system (i.e., system 100), in some embodiments, some of the steps 802-808 can otherwise be performed by a separate or remote device, such as a server. Indeed, one of ordinary skill in the art will readily recognize that one or more of the steps described herein can be performed by one or more different devices. For example, in some cases, the firmware file may be signed by one device (e.g., a server) and validated or authorized by a different device (e.g., system 100). In fact, the steps herein are described as being performed by the same system as a non-limiting example for clarity and explanation. Again, other combinations of steps and devices are also contemplated herein.

FIG. 9 illustrates an example method 900 for securing the firmware file. Here, the server 208 can first sign the firmware file to create a message digest (902). The server 208 can sign the firmware file by applying a function, such as a hash function (e.g., MD5, SHA, etc.), to the firmware file to create the message digest.

The server 208 can also encrypt the message digest (904). The server 208 can encrypt the message digest using any encryption mechanism. For example, the server 208 can encrypt the message digest with a key based on a symmetric or asymmetric encryption mechanism. In some embodiments, the server 208 can encrypt the message digest with a private key. The server 208 can then integrate the encrypted message digest into a user firmware volume containing the firmware file (906).

Next, the system 210 can extract the encrypted message digest and firmware file from the user firmware volume (908). For example, the system 210 can receive the user firmware volume from the server 208 (or any other device) and extract its contents. In some cases, the system 210 can receive the user firmware volume from the server 208 over network 202. The system 210 can then decrypt the message digest extracted from the user firmware volume (910) and sign the firmware file extracted from the user firmware volume to create a second message digest (912). The system 210 can sign the firmware file extracted by applying the same hash function used to sign the firmware file at step 902. This will yield a second message digest (i.e., signed firmware file), which can be compared with the message digest from step 902 to determine authenticity of the firmware file or detect any manipulations or modifications to the firmware file.

Next, the system 210 can authorize the firmware file (914). The system 210 can authorize the firmware file by comparing the message digest from step 902 with the second message digest. If the message digest from step 902 and the second message digest match, the system 210 can validate or authorize the firmware file. Alternatively, if the message digest from step 902 and the second message digest do not match, the system 210 can invalidate the firmware file or deem it unauthorized. Here, the system 210 can ignore or discard the firmware file for not being validated or authorized.

While the various steps described above with reference to FIG. 9, including steps 902-914, are described as being performed by the different systems (i.e., server 208 and system 210), in some embodiments, some of the steps herein can otherwise be performed by the same device, such as system 210. Moreover, in other embodiments, some of the steps herein can be performed by other, additional devices, such as another server or a centralized system, for example. Again, steps 902-914 are described with reference to system 210 and server 208 for clarity and explanation purposes.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language reciting "at least one of" a set indicates that one member of the set or multiple members of the set satisfy the claim. Tangible computer-readable storage media, computer-readable storage devices, or computer-readable memory devices, expressly exclude media such as transitory waves, energy, carrier signals, electromagnetic waves, and signals per se.

I claim:
1. A method comprising:
    generating a user firmware volume within a local computer firmware volume of a computing device which contains computer firmware used by the computing device during a boot process, the user firmware volume comprising a file system;
    obtaining a signed firmware file for updating the computer firmware used by the computing device during the boot process, wherein the signed firmware file is generated by integrating an encrypted message digest to a firmware file, the encrypted message digest generated by encrypting a first message digest with a first key, the first message digest generated by applying a hash function to the firmware file;
    extracting the encrypted message digest and the firmware file from the signed firmware file;

decrypting the message digest with a second key associated with the first key used to encrypt the message digest;
applying the hash function to the firmware file extracted from the signed firmware file to generate a second message digest;
determining that the second message digest is consistent with the first message digest;
comparing the firmware file with a content of the local computer firmware volume to yield a comparison, wherein comparing the firmware file with the content of the local computer firmware volume comprises:
  determining that the firmware file corresponds to an existing firmware file stored on the computer firmware local computer volume, the existing firmware being a part of the computer firmware; and
  determining, via at least one of a pre-extensible firmware interface initialization dispatcher and a driver execution environment dispatcher, whether the firmware file comprises a different firmware file version as the existing firmware file;
determining that the firmware file corresponds to an existing firmware file that is currently stored on the local computer firmware volume;
determining that the firmware file and the local computer firmware volume belong to a same firmware module by comparing a global unique identifier (GUID) of the firmware file with a GUID of the existing firmware file; and
based on the comparison, storing the firmware file on the user firmware volume within the local computer firmware volume without flashing an entire portion of the computer firmware used by the computing device during the boot process, wherein storing the firmware file comprises loading the firmware file into the local computer firmware volume and executing the computer firmware with the firmware file.

2. The method of claim 1, further comprising:
based on the comparison, determining that the firmware file does not correspond to an existing firmware file that is currently stored on the local computer firmware volume; and
wherein storing the firmware file on the user firmware volume comprises storing the firmware file as a new file without replacing an existing file on the computer firmware volume and the user firmware volume.

3. The method of claim 1, further comprising:
when the firmware file corresponds to an existing firmware file that is currently stored on the local computer firmware volume, determining whether the firmware file comprises a newer version of the existing file, and
when the firmware file comprises the newer version, replacing the existing firmware file with the firmware file.

4. The method of claim 3, wherein determining that the firmware file corresponds to an existing firmware file that is currently stored on the local computer firmware volume comprises:
comparing a global unique identifier associated with the firmware file with respective global unique identifiers associated with firmware files stored on the computer firmware volume; and
determining that the global unique identifier associated with the firmware file and a respective global unique identifier of the existing firmware file are a match.

5. The method of claim 1, wherein the firmware file is generated based on a unified extensible firmware interface platform initialization specification.

6. The method of claim 1, further comprising validating the firmware file extracted from the signed firmware file to yield a validated firmware file, wherein storing the firmware file comprises storing the validated firmware file.

7. The method of claim 1, wherein storing the firmware file is performed in-band or out-of-band.

8. The method of claim 1, wherein the storing comprises:
identifying, based on the comparison, one or more modules of the firmware file in the user firmware module that need to be integrated into the computer firmware used by the computing device during the boot process, and
integrating the one or more modules in the local computer firmware volume, the integrating of each one of the one or more modules comprising one of: using the one of the one or more modules to replace a corresponding module of the computer firmware used by the computing device during the boot process or adding the one of the one or more modules to the computer firmware used by the computing device during the boot process,
wherein only a portion of the computer firmware associated the with the one or more modules is flashed during the integrating.

9. The method of claim 8, wherein the identifying comprises identifying the one or more modules by comparison of identifiers associated with the modules of the computer firmware used by the computing device during the boot process and identifiers associated with modules of the firmware file.

10. A system comprising:
a processor; and
a computer-readable storage medium having stored therein instructions which, when executed by the processor, cause the processor to perform operations comprising:
  within a local computer firmware volume containing the computer firmware used by the system during the boot process, generating a user firmware volume comprising a file system for storing the firmware file within the local computer firmware volume as part of the computer firmware;
  obtaining a signed firmware file for updating the local computer firmware used by the computing device during the boot process, wherein the signed firmware file is generated by integrating an encrypted message digest to a firmware file, the encrypted message digest generated by encrypting a first message digest with a first key, the first message digest generated by applying a hash function to the firmware file;
  extracting the encrypted message digest and the firmware file from the signed firmware file;
  decrypting the message digest with a second key associated with the first key used to encrypt the message digest;
  applying the hash function to the firmware file extracted from the signed firmware file to generate a second message digest;
  determining that the second message digest is consistent with the first message digest;
  comparing the firmware file with a content of the computer firmware volume to yield a comparison, wherein comparing the firmware file with the content of the local computer firmware volume comprises:

determining that the firmware file corresponds to an existing firmware file stored on the computer firmware local computer volume, the existing firmware being a part of the computer firmware; and determining, via at least one of a pre-extensible firmware interface initialization dispatcher and a driver execution environment dispatcher, whether the firmware file comprises a different firmware file version as the existing firmware file;

determining that the firmware file corresponds to an existing firmware file that is currently stored on the local computer firmware volume;

determining that the firmware file and the local computer firmware volume belong to a same firmware module by comparing a global unique identifier (GUID) of the firmware file with a GUID of the existing firmware file; and based on the comparison, storing the firmware file on the user firmware volume within the local computer firmware volume without flashing an entire portion of the computer firmware used by the system during the boot process wherein storing the firmware file comprises loading the firmware file into the local computer firmware volume and executing the computer firmware with the firmware file.

11. The system of claim 10, the computer-readable storage medium storing additional instructions which, when executed by the processor, cause the processor to perform operations further comprising:

based on the comparison, determining that the firmware file does not correspond to an existing firmware file that is currently stored on the local computer firmware volume; and wherein storing the firmware file on the user firmware volume comprises storing the firmware file as a new file without replacing an existing file on the local computer firmware volume and the user firmware volume.

12. The system of claim 10, the computer-readable storage medium storing additional instructions which, when executed by the processor, cause the processor to perform operations further comprising:

based on the comparison, determining that the firmware file corresponds to an existing firmware file that is currently stored on the local computer firmware volume;

determining that the firmware file comprises a newer version of the existing file, and replacing the existing firmware file with the firmware file.

13. A non-transitory computer-readable storage medium having stored therein instructions which, when executed by a processor, cause the processor to perform operations comprising:

within a local computer firmware volume containing computer firmware used by a computing device during a boot process, generating a user firmware volume comprising a file system within the local computer firmware volume;

obtaining a signed firmware file for updating the local computer firmware used by the computing device during the boot process, wherein the signed firmware file is generated by integrating an encrypted message digest to a firmware file, the encrypted message digest generated by encrypting a first message digest with a first key, the first message digest generated by applying a hash function to the firmware file;

extracting the encrypted message digest and the firmware file from the signed firmware file;

decrypting the message digest with a second key associated with the first key used to encrypt the message digest;

applying the hash function to the firmware file extracted from the signed firmware file to generate a second message digest;

determining that the second message digest is consistent with the first message digest;

comparing the firmware file with a content of the local computer firmware volume to yield a comparison, wherein comparing the firmware file with the content of the local computer firmware volume comprises:

determining that the firmware file corresponds to an existing firmware file stored on the computer firmware local computer volume, the existing firmware being a part of the computer firmware; and determining, via at least one of a pre-extensible firmware interface initialization dispatcher and a driver execution environment dispatcher, whether the firmware file comprises a different firmware file version as the existing firmware file;

determining that the firmware file corresponds to an existing firmware file that is currently stored on the local computer firmware volume;

determining that the firmware file and the local computer firmware volume belong to a same firmware module by comparing a global unique identifier (GUID) of the firmware file with a GUID of the existing firmware file; and based on the comparison, storing the firmware file on the user firmware volume within the local computer firmware volume without flashing an entire portion of the computer firmware used by the computing device during the boot process, wherein storing the firmware file comprises loading the firmware file into the local computer firmware volume and executing the computer firmware with the firmware file.

14. The non-transitory computer-readable storage medium of claim 13, wherein the firmware file is generated based on a unified extensible firmware interface platform initialization.

15. The non-transitory computer-readable storage medium of claim 13, wherein comparing the firmware file with the content of the local computer firmware volume comprises:

determining that the firmware file corresponds to an existing firmware file stored on the local computer firmware volume which is part of the computer firmware;

determining, via at least one of a pre-extensible firmware interface initialization dispatcher and a driver execution environment dispatcher, whether the firmware file comprises a newer firmware file version of the existing firmware file; and storing the firmware file on the user firmware volume when the firmware file is determined to be the newer firmware file version of the existing firmware file.

* * * * *